US006535839B1

(12) United States Patent
Mack et al.

(10) Patent No.: US 6,535,839 B1
(45) Date of Patent: Mar. 18, 2003

(54) METHOD FOR COMBINING THE COMPUTER MODELS OF TWO SURFACES IN 3-D SPACE

(75) Inventors: Walter J. Mack, Chandler, AZ (US); Jean-Charles Korta, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/574,284

(22) Filed: May 19, 2000

Related U.S. Application Data

(62) Division of application No. 09/158,323, filed on Sep. 22, 1998, now Pat. No. 6,178,392.

(51) Int. Cl.$^7$ ................................................ G06G 7/48
(52) U.S. Cl. .................. 703/7; 703/1; 703/2; 345/419; 345/581
(58) Field of Search ........................ 703/1–8; 433/29; 382/124, 151, 420; 600/414, 426; 356/399; 345/419–427, 581–618

(56) References Cited

U.S. PATENT DOCUMENTS

| 4,585,337 A | 4/1986 | Phillips ....................... 355/45 |
| 4,845,503 A | 7/1989 | Adam et al. ................. 342/448 |
| 5,109,479 A | 4/1992 | Williams ..................... 345/582 |
| 5,283,641 A | 2/1994 | Lemelson ..................... 348/92 |
| 5,487,011 A | 1/1996 | Chaiken ...................... 700/135 |
| 5,613,013 A | 3/1997 | Schuette ..................... 382/124 |
| 5,665,095 A | 9/1997 | Jacobsen ..................... 606/130 |
| 5,751,843 A | 5/1998 | Maggioni et al. ........... 382/154 |
| 5,793,372 A | 8/1998 | Binns et al. ................. 345/419 |
| 5,954,647 A | 9/1999 | Bova et al. .................. 600/407 |

OTHER PUBLICATIONS

Hara et al, "Regularization–Based 3–D Object Modeling from Multiple Range Images", IEEE Proceddings of the 14th Internation Conference on Patten Recognition, vol. 2, pp. 964–968 (Aug. 1998).*

Wang et al, "Shape Simplification of Free–Form Surface Objects for Multi–Scale Representation", IEEE International Conference on Systems, Man, and Cybernetics, vol. 3, pp. 1623–1628 (Oct. 1996).*

\* cited by examiner

*Primary Examiner*—Samuel Broda
(74) *Attorney, Agent, or Firm*—Blakely, Sokoloff, Taylor & Zafman LLP

(57) ABSTRACT

A method and apparatus pertains to aligning and/or stitching together several 3-D fragments. The steps comprise determining at least two fragments having a corresponding set of alignment marks and aligning at least two fragments with respect to a coordinate system using the corresponding set of alignment marks in the respective fragments.

8 Claims, 8 Drawing Sheets

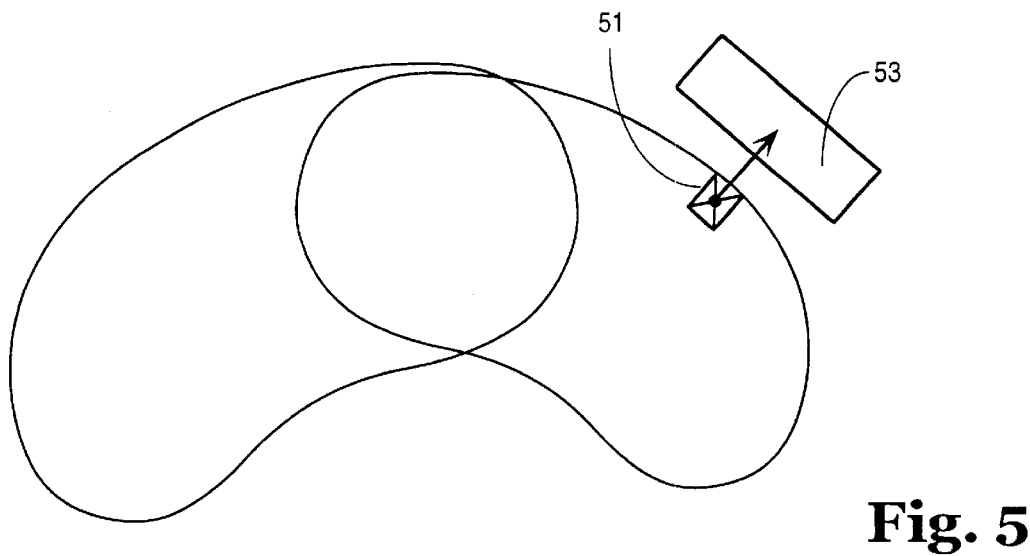
Fig. 5
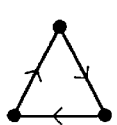 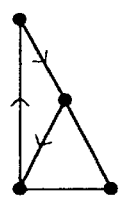 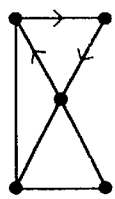 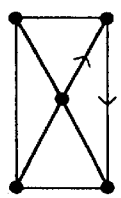
Fig. 6a     Fig. 6b     Fig. 6c     Fig. 6d

```
┌─────────────────────────────────────────┐
│ BETWEEN TWO FRAGMENTS TO BE STITCHED,   │
│ LET ONE FRAGMENT BE THE FIRST FRAGMENT  │
│ AND THE OTHER FRAGMENT BE A SECOND      │
│ FRAGMENT                             71 │
└─────────────────────────────────────────┘
                    ▼
┌─────────────────────────────────────────┐
│ DESIGNATE A HULL EDGE (FIRST HULL EDGE) IN │
│ THE FIRST FRAGMENT                   72 │
└─────────────────────────────────────────┘
                    ▼
┌─────────────────────────────────────────┐
│ FIND THE FIRST HULL EDGE THAT ENTERS INTO │
│ THE SECOND FRAGMENT                  73 │
└─────────────────────────────────────────┘
                    ▼
┌─────────────────────────────────────────┐
│ CONTINUE MOVING ON THE FIRST HULL EDGES │
│ UNTIL A FIRST HULL EDGE EXITS THE SECOND │
│ FRAGMENT                             74 │
└─────────────────────────────────────────┘
                    ▼
┌─────────────────────────────────────────┐
│ BUILD FACES IN THE SECOND FRAGMENT THAT │
│ INTERSECTS THE FIRST HULL EDGES DETECTED │
│ IN THE SECOND FRAMENT AND MARK THE      │
│ FACES                                75 │
└─────────────────────────────────────────┘
                    ▼
┌─────────────────────────────────────────┐
│ PROPAGATE THE FACES IN THE SECOND    76 │
│ FRAGMENT IN THE REGION THAT OVERLAPS    │
│ THE FIRST FRAGMENT AND MARK THE FACES   │
└─────────────────────────────────────────┘
                    ▼
┌─────────────────────────────────────────┐
│ REMOVE THE MARKED FACES              77 │
└─────────────────────────────────────────┘
                    ▼
┌─────────────────────────────────────────┐
│ STITCH THE FIRST AND SECOND FRAGMENT 78 │
└─────────────────────────────────────────┘
                    ▼
┌─────────────────────────────────────────┐
│ GENERATE TEXTURE FOR THE STITCHED       │
│ SURFACE                              79 │
└─────────────────────────────────────────┘
```

Fig. 7

METHOD FOR COMBINING THE COMPUTER MODELS OF TWO SURFACES IN 3-D SPACE

This application is a division of U.S. patent application Ser. No. 09/158,323, filed Sep. 22, 1998, now U.S. Pat. No. 6,178,392 issued Jan. 23, 2001.

BACKGROUND (1) Field of the Invention

The invention relates to 3-D modeling, in particular, to alignment and/or stitching of various 3-D fragments.

(2) Related Art

In creating a three-dimensional (3-D) model of a real object, a multitude of images of the real object may be taken from different positions to exploit the differences in the object's projection. Multitude of images may be captured, for example, using an imaging device such as a camcorder or a digital camera comprising an image sensor. The image sensor generally comprises a photosensitive pixel array where each pixel captures an incident light falling on it. Thus, the combination of the pixels within the pixel array may be able to capture an image from the incident light. Generally, to re-construct a surface of an object into 3-D model, the surface should be present in at least two images since re-construction is based on the surface intersection of the two images. These two or more images (i.e. stereoscopic image) of the object having the above characteristics may be suitable for subsequent processing into 3-D models.

With the stereoscopic image in mind for 3-D data extraction, complete objects may not be captured in a single take and perhaps, only a fragment may be captured. The limitation may be perhaps due to the size of the object or the object's surface contour deviation from a plane which may not be visible by more than one imaging device. In another instance, the object being captured may have occluded surfaces complicating a single take stereoscopic image. An example of an occluded surface may be a full human body with the occlusions being the arms, legs, ears, and etc. Using a mechanical displacement of either the object, the imaging devices or both, various fragments of the object may be captured. Like a jigsaw puzzle, the various fragments may have to be fitted together in its correct position to produce a more complete 3-D model of the object. Generally, the fitting process may comprise an "alignment" process and/or a "stitching" process. The alignment process is generally a correct positioning of two or more fragments. The stitching process is generally an interweaving of two or more correctly positioned fragments into one fragment or surface representing the desired 3-D model of the object.

The present invention pertains to a method and apparatus for producing a more complete 3-D model of an object by capturing various fragments of the object, aligning the fragments, and/or stitching the fragments into one surface which may be the 3-D model of the object.

BRIEF SUMMARY

A method and apparatus pertains to aligning and/or stitching together several 3-D fragments. The steps comprise locating at least two fragments having a corresponding set of alignment marks and aligning at least two fragments with respect to a coordinate system using the corresponding set of alignment marks in the respective fragments.

BRIEF DESCRIPTION OF THE DRAWINGS

FIG. 5 is a schematic illustrating a formation of a patch and a two dimensional (2-D) plane according to one embodiment of the invention;

FIGS. 6a–6d are schematics illustrating a formation of a face according to one embodiment of the invention;

FIG. 7 is a flow chart of a stitching procedure according to one embodiment of the invention;

DETAILED DESCRIPTION

A method and apparatus is disclosed for producing a more complete three-dimensional (3-D) model of an object by aligning and/or stitching together fragments of an object captured by a 3-D imaging device system until a desired level of completeness in the 3-D model of the original object may be achieved.

Figure 1:
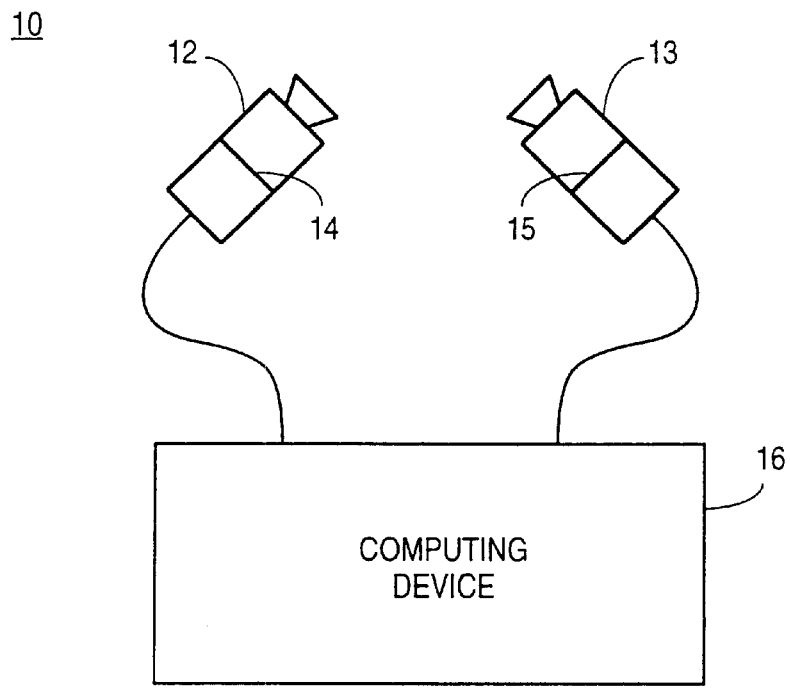
FIG. 1 is a schematic of a 3-D imaging device to capture stereoscopic images of objects.

Three-dimensional (3-D) models may be created from stereoscopic images of real objects using imaging devices such as a video camcorder or digital camera. Such imaging devices exploit differences in the object's projection, which may be obtained based on the location of the imaging device's optical system, for example, its lens and its photosensitive area (i.e. the image sensor). FIG. 1 illustrates one embodiment of a 3-D imaging device system. The 3-D imaging device system 10 illustrated is shown with two imaging devices 12 and 13. Each imaging device 12 and 13 comprises an image sensor 14 and 15 used to capture an image of a target object. The 3-D imaging device system 10 may include a computing device 16 to process the stereoscopic images captured by the imaging devices 12 and 13 into 3-D data. 3-D data is generally a plurality of points in 3-D space which may be identified as a 3-D point image of an object. The computing device may be a microprocessor, an arithmetic logic unit (ALU) or other device capable of processing information. To go one step further, the computing device 16 may even process the 3-D data into 3-D models depending on the sophistication of the underlying software. As an example, 3-D data may be "triangulated" (i.e. forming the surface of the object by forming triangles with every three points of the 3-D data) using conventional algorithms such as Delaunay's algorithm. Other algorithms may be used including suitable geometric structures. Textural data may be applied to the triangulated structure by using, for example, True Space, a software commercially available from Caligary, Mountain View, Calif. Other software may be used. Generally, textural data comprises material information such as physical surface properties of an object and may also comprise color information of the object. Alternatively, the images may be stored in the imaging devices 12 and 13 to be processed at a later time, thus, the need for a computing device in the 3-D imaging device system may not be required.

Calibration may be performed on imaging devices 12 and 13 to determine each position and orientation of the imaging devices before any stereoscopic images may be captured. By performing calibration, the imaging devices may be placed in a coordinate system that allows the computer used to create the 3-D data to determine the relative position of the imaging devices in the coordinate system. With the position of the imaging devices determined, the captured stereoscopic images may be correlated as one input in order to form the 3-D data for 3-D modeling. To illustrate this point, imagine two imaging devices in 3-D space taking an image of the same object to form a left image and a right image of the object which may be the stereoscopic image of the object. Due to the differences in the two images, stereoscopic matching may take place. Stereoscopic matching is a process where a point feature in one image may be matched with the corresponding point feature in the other image. While the human visual system may readily detect the various features of the left image and the right image, and correlate the two images together, a computer performing a similar function may need to define the various features in terms of coordinates in a coordinate system. The relevant information from this activity is the set of coordinates for each image which may determine a location of a feature in the image. The coordinate set of the features in all images, together with the position of the imaging devices with which each image was taken may then be used to determine the original location in 3-D space of the identified feature. An example of a calibration method may be found in a pending application titled "Imaging Device Orientation Information Through Analysis of Test Images" Ser. No. 09/108,436, filed on Jun. 30, 1998.

Figure 2:
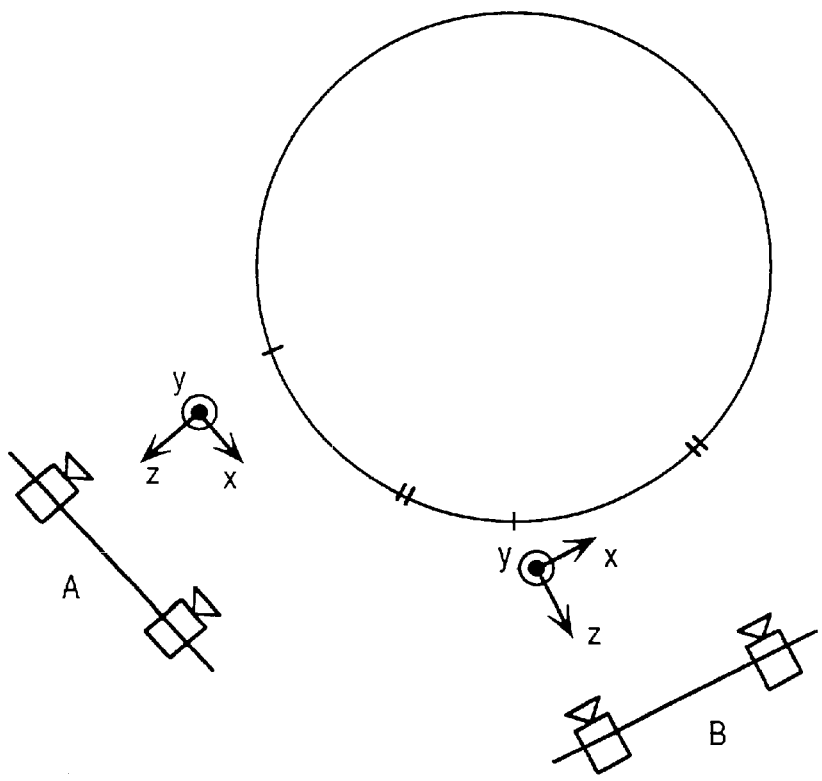
FIG. 2 illustrates capturing fragments of an object using a 3-D imaging device.

FIG. 2 illustrates capturing fragments of an object, perhaps, by an illustrated 3-D imaging device system 10 described above. The illustrated 3-D imaging device system 10 may reliably capture a fragment provided its distance, curvature and extent are within a given range of the 3-D imaging device system. As the 3-D imaging device system is moved from position to position, for example from position A to position B, successive fragments may be captured. It is desirable that the successive fragment overlap with the previously captured fragment so that parts of the object would not be missing between fragments. Furthermore, under certain alignment methods, see FIGS. 4a–4c for example, the overlap may contain alignment information to aid in the aligning of the two fragments. Note that as the position of the 3-D imaging device system changes with the capture of successive fragments, the coordinate system in which the 3-D imaging device system has been placed changes with the position as illustrated in FIG. 2. In this instance, each of the captured fragments may have to be colocated through an alignment procedure.

Figure 3:
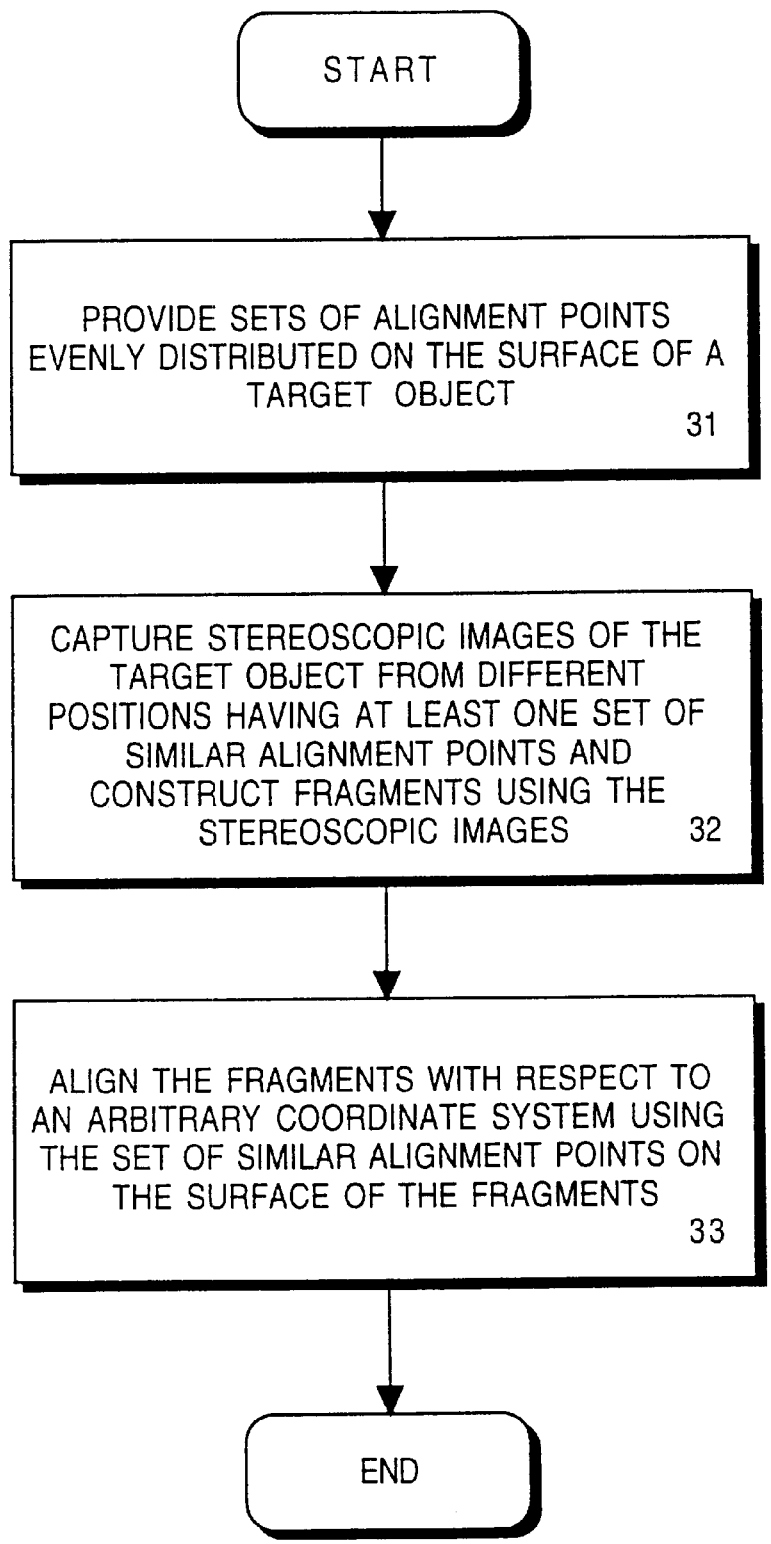
FIG. 3 is a flow chart of an alignment procedure according to one embodiment of the invention.
Figure 4A:
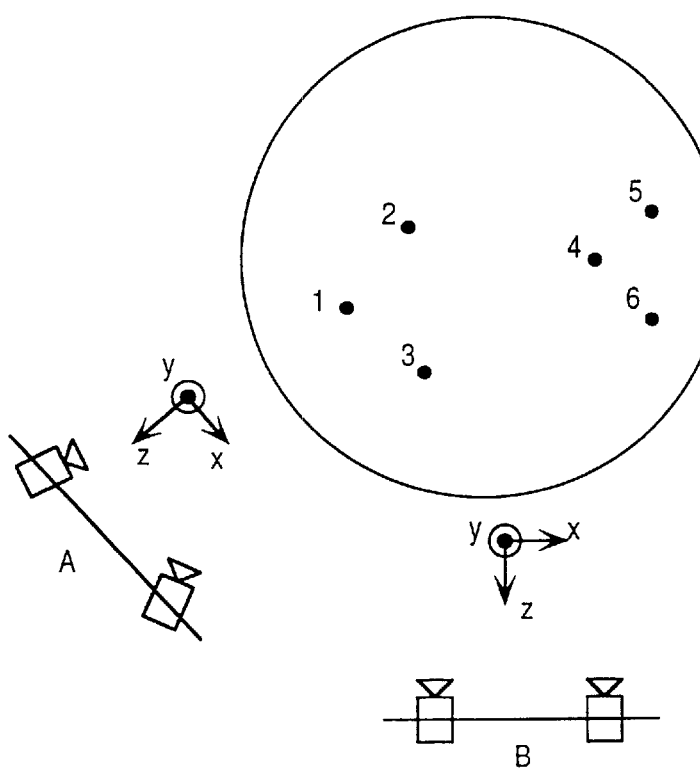
FIGS. 4a–4c are schematics illustrating an alignment procedure according to one embodiment of the invention.
Figure 4B:
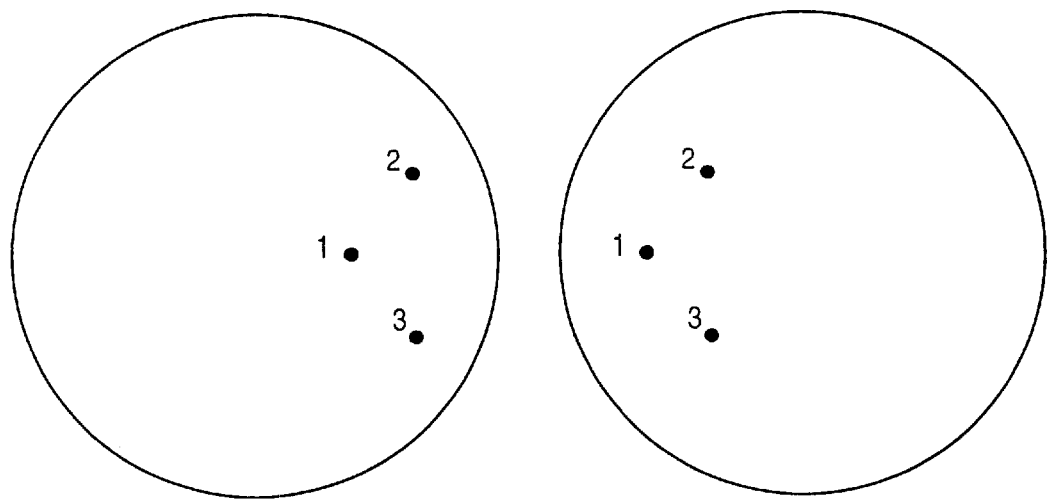

FIG. 3 is a flow chart of an alignment procedure according to one embodiment. To aid in the understanding of the procedure, FIGS. 4a–4c will be used. In block 31, sets of alignment points may be evenly dispersed around a target object such that each stereoscopic image of a fragment of the object contains a set of alignment points. Each set may comprise three points with unique codings that may be machine recognizable and placed in a triangular manner, for example. In another example, a set may be labeled points 1, 2, and 3 and another set may be labeled points 4, 5 and 6 and so forth. FIG. 4a illustrates a target object with the labeled set of alignment points located at its surface. In block 32, from a position, for example, position A, a stereoscopic image of the object may be captured by the 3-D imaging device system including a set of alignment points. The 3-D imaging device system may be moved to position B where another stereoscopic image may be captured which may also include the set of alignment points. From the two stereoscopic images, 3-D models of two fragments of the object may be generated as illustrated in FIG. 4b, both fragments having a similar set of alignment points.

Figure 4C:
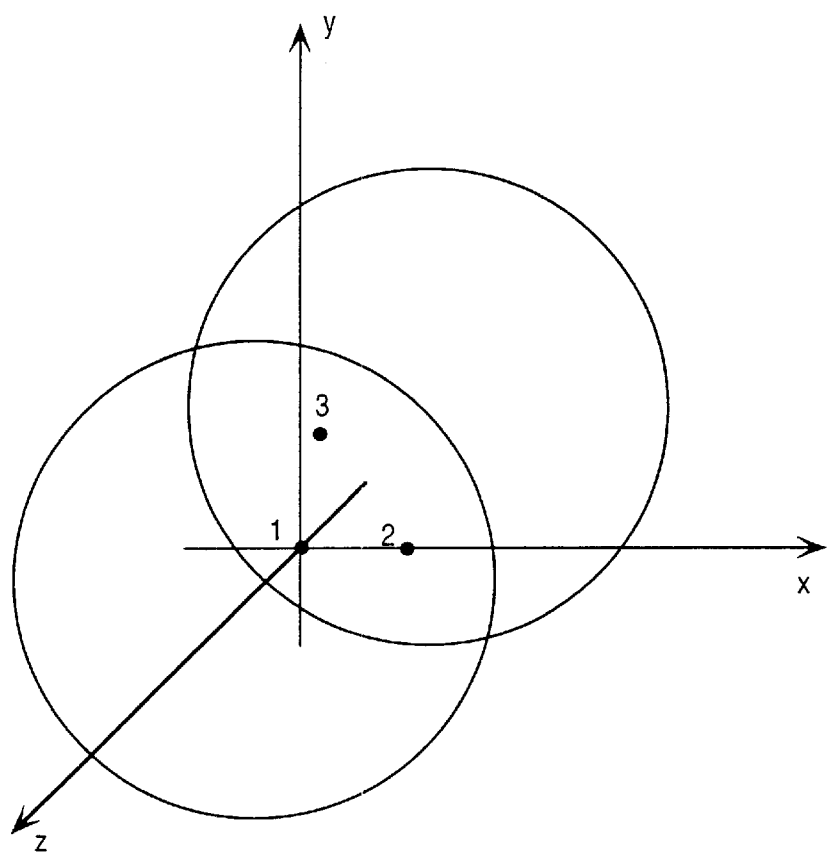

In block 33, the alignment of the two fragments takes place. Referring to FIG. 4c, in one embodiment, for the first fragment, point 1 may be positioned at an origin of an arbitrary coordinate system. Point 2 may be positioned such that it lies on the X-axis of the arbitrary coordinate system. With point 1 and point 2 fixed as described above, point 3 may be rotated about the X-axis until point 3 lies in the X-Y plane of the arbitrary coordinate system. Similarly for the second fragment, point 1 may be positioned on the origin of the arbitrary coordinate system, point 2 may be positioned on the X-axis, and point 3 may be positioned in the X-Y plane of the arbitrary coordinate system. FIG. 4c illustrates the aligned two fragments using the procedure described above. With the two fragments aligned, other fragments may be aligned with the two aligned fragments using the procedure described above. The remaining description will be described in terms of two fragments, however, one skilled in the art will recognize that the description is equally applicable to more than two fragments.

Regarding a stitching procedure, a "region of overlap" between fragments may be identified so that a stitching procedure may take place. In theory, the overlap of one fragment should coincide with the overlap of the other fragment, however, in practice, the surface models may not be an exact re-construction of the original, thus, may not coincide. Furthermore, an overlap may not take place due to inherent discrepancies and the two fragments being defined in 3-D space. Instead, the two fragments may "interweave" with each other with points on one fragment being in close proximity to the corresponding points of the other fragment. A technique to find the overlap may be to project the two fragments onto a common two-dimensional (2-D) plane. However, projecting onto a common 2-D plane may be infeasible where the fragments involved may be generally non-planar such that the "right" orientation of the projection plane which is typically parallel to the surface of the fragment, may vary dependent on the relative location on a fragment. Generally, the aligned non-planar surfaces of the two fragments may not project onto a 2-D plane without some distortions being involved. In these instances, the projection may be performed in small "patches" on the fragments with an assumption that the patches are reasonably flat.

FIG. 5 illustrates a patch 51. Patch 51 may be defined by a point on a fragment and a plurality of "faces" where each face has as one of its vertices the point on the fragment. Note that the vertices may be the 3-D data of the fragment. A face may comprise at least three "edges" defining the face. An edge is one line of a face, connecting two vertices of the face. To allow for a fast find of a face, an edge may have certain characteristics. For example, the edge may be directional and may have information regarding a next edge. Generally, such information may be stored in a memory device. The movement from one edge to a next edge and to a second next edge may complete a face if the face has three edges. A face may also have an "inverse" edge. This may be the edge which connects the same two vertices but in the opposite direction. Generally, the inverse edge may be part of a neighboring face. With the above concepts in mind, referring to FIG. 6a, an edge may move to the next edge and to the second next edge until the second next edge arrives at the starting vertex to define a face. In FIG. 6b, the last edge may be checked for an inverse edge and if an inverse edge is found, starting with the inverse edge, the process may be repeated until another face is defined, for example. Another inverse edge may be determined and the process may be repeated as illustrated in FIGS. 6c–6d until the original edge is encountered. This may complete the faces defining a patch. When the patch is defined, a 2-D plane 53 as illustrated in FIG. 5 may be formed that is normal to the patch.

An edge which is on the boundary of a fragment does not have an inverse edge and is defined as "hull" edge. A hull edge typically has information on the next hull edge which may be stored in a memory device. Moving from hull edge to next hull edge and so forth may ultimately return to the original hull edge, thus, by tracing the hull edges, the boundary of the fragment may be determined.

To find an overlap between two fragments, a crossing between two fragment hulls may be detected in the 2-D projection plane formed from patches of hull edges. Typically, two crossings may be detected marking the entrance into the overlapped surface and the exit of the overlapped surface. However, where the fragments may be substantially warped, a false crossing may be detected. For example, the crossed hull edge of the other fragment may not be a hull edge in the immediate vicinity, instead, may be a hull edge on the far side of the fragment that is projected onto the 2-D plane because of the warp. Accordingly, the distance between the two crossed hull edges of the fragments may be tested to be within a desired vicinity. As to the remaining figures, an example of finding the overlap between two fragments and a stitching procedure will now be described.

Referring to FIG. 7, a flow chart related to finding an overlap region between to two fragments, deleting the overlap region, and stitching according to one embodiment is shown. In blocks 71–74, there is a movement between successive hull edges of the first fragment (first hull edge) until a hull edge of the second fragment (second hull edge) is encountered. Note that the encountered second hull edge may be tested to be within the desired vicinity since the second hull edge may be from the far side of the second fragment, thus irrelevant to the determination of the overlapping region. In the first hull edge, a patch may be formed in a manner described previously so that a 2-D plane corresponding to the first hull edge may be determined. The first hull edge on the patch may be projected onto the 2-D plane. The second hull edges may also be projected onto the 2-D plane to determine if there is a crossing with the first hull edge. If no crossing is found, a movement may occur to the next first hull edge and another patch may be reconfigured with respect to the moved next first hull edge. The patch may be reconfigured because the 2-D projection plane of the patch corresponding to the next first hull edge may be different from the 2-D projection plane of the patch corresponding to the previous first hull edge due to differences in the surface orientation of the two hull edges in the first fragment, for example. The procedure may be repeated until a crossing with the second hull edge may be found.

Whether the first hull edge crosses into or out of the surface of the second fragment may be determined by a rotational position of the first hull edge with respect to the crossed second hull edge. As an example, if the first hull edge requires that it be angularity rotated outward to be parallel with the crossed second hull edge, then the first hull edge may be crossing into the surface of the second fragment. Alternatively, if the first hull edge requires that it be angularity rotated inward to be parallel with the crossed second hull edge, then the first hull edge may be crossing out of the surface second fragment. If the first hull edge is crossing out of the surface of the second fragment, the procedure described above may be performed until the first hull edge crossing into the surface of the second fragment may be determined.

In block 75, faces are built in the second fragment following the path of the crossing first hull edges with edges associated with the vertices of the second fragment. The formed faces are marked for reasons that will become apparent. In this instance, the faces may be marked "false". In building a face from edges associated with the second fragment and in this instance, allowing a face to have three edges, the first edge may be the crossed second hull edge, the second and the third edges may be formed in the manner described in FIG. 6a. The first hull edge may be checked to determine if the first hull edge further crosses the second edge or the third edge. If either the second edge or the third edge is crossed, a next face may be built with edges associated with the vertices of the second fragment with the crossed edge as the new first edge. If neither the second edge nor third edge is crossed, then the crossing of the second edge or the third edge may be determined in a successive first hull edge. When moving to the successive first hull edge, it is desirable to re-calculate the projection plane with respect to the successive first hull edge because of the difference in the 2-D projection plane that may occur due to differences in the orientation of the two first hull edges in the first fragment.

There may be instances that in the new projection plane the successive first hull edge may be crossing the face in a manner disconnected from the previous first hull edge, perhaps due to differences in surface orientation as described above. For example, the new projection may be such that the successive first hull edge may be outside the face generated in the second fragment. In this instance, the end point of the previous first hull edge may be stored as a positional value with respect to the second edge and the third edge. This positional value may be used as the starting point of the successive first hull edge and the end point of the successive first hull edge may remain the same. The crossed second edge or the third edge may become the first edge of the new face.

Figure 8:
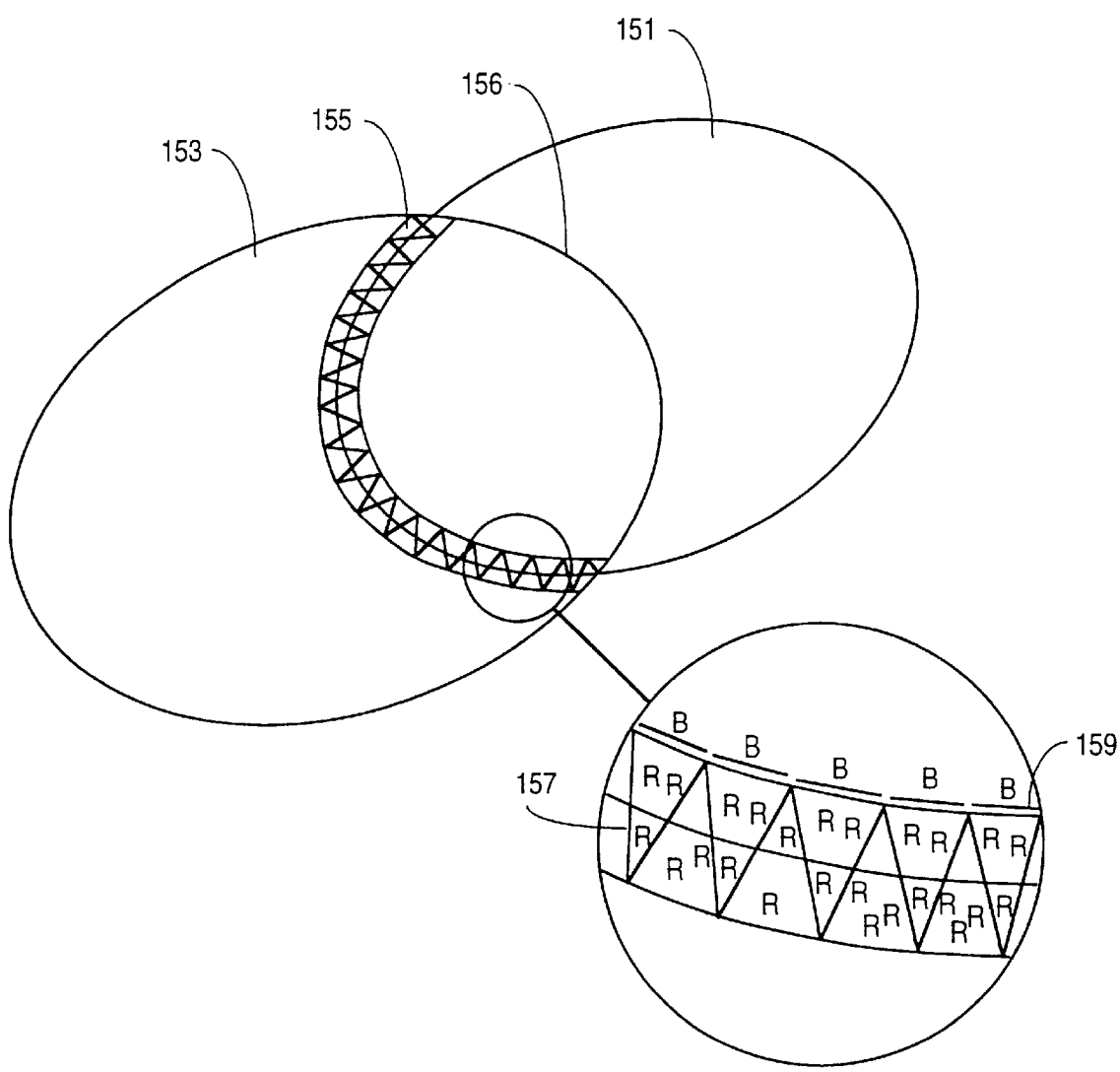
FIG. 8 is a schematic illustrating formation of a plurality of faces that may be marked and colored according to one embodiment of the invention.
Figure 9:
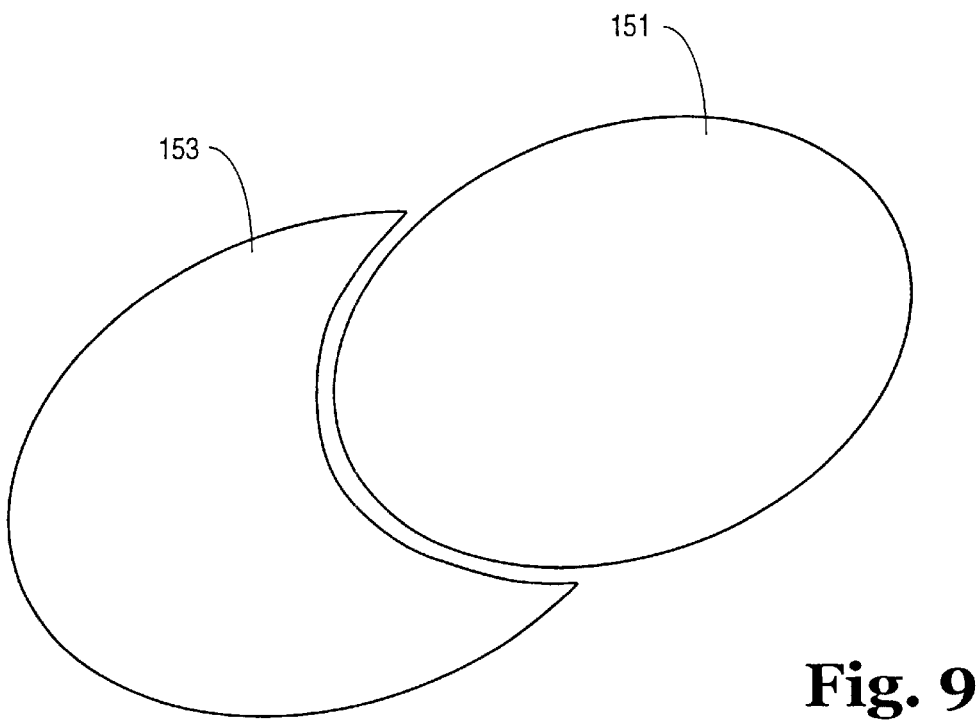
FIG. 9 is a schematic illustrating an overlapping region in removed from one fragment according to one embodiment of the invention.
Figure 10:
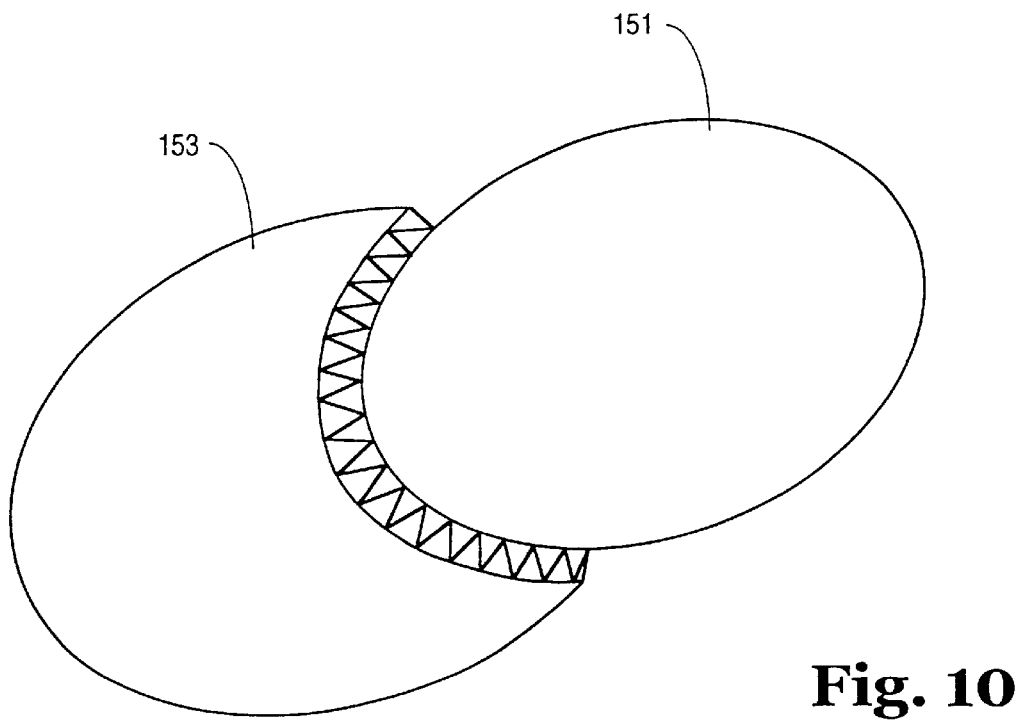
FIG. 10 is a schematic illustrating two fragments being stitched to form an integrated fragment according to one embodiment of the invention.

FIG. 8 illustrates a plurality of faces 155 formed on the surface of the second fragment 153 that may correspond to the procedure described in block 75 of FIG. 7. Between the entry and exit of the first hull edges on the surface of the second fragment 153, faces 155 may be formed on the surface of the second fragment 153 with the successive first hull edges that may be found in the immediate vicinity of the surface of the second fragment 153. The faces 155 may be marked false. With the faces formed, propagation of the faces may commence according to block 76. Coloring may be performed on the edges of the faces. In one example, the edges may be colored "red". One skilled in the art will recognize that other colors may be used. Detection for red colored edge having a reverse edge in the overlapped region is determined. If detected, the reversed edge may be colored "blue", for example. One skilled in the art will recognize other colors may be used. This example is illustrated in FIG. 8. Note that this dual color approach is adopted due to easier computing device processing implementation. However, one skilled in the art will appreciate that a single color or no color approach may be used. With the reversed edge marked blue, a face is formed using edges associated with the second fragment and the face may be marked false. The edges associated with the face may be marked blue. If the face has a reverse edge, the above procedure is repeated. The procedure may be repeated until the second hull edges 156 may be encountered. Note that a hull edge does not have an inverse edge. During the repetition of the procedure, the faces associated with the overlapped region may be identified and marked blue if an inverse of an edge is not red. The edges marked blue identifies the faces to be marked false that in turn identify the overlapped region of the first fragment and the second fragment. In block 77, the removal of faces from second fragment that may overlap with surface of the first fragment is performed. All faces marked false may be eliminated from the surface of the second fragment. Stated differently, in this example, all faces colored red and blue are removed leaving a channel between the first fragment 151 and the modified second fragment 153 as illustrated in FIG. 9. In block 78, stitching the first fragment and the second fragment together when the overlapping region of the second fragment removed is performed. This is illustrated in FIG. 10. Note that the second fragment forms a new hull edge in the removed region. The new second hull edge and the first hull edge in the immediate vicinity of the new second hull edge may be projected onto a 2-D plane and the points from the two edge list may be triangulated (i.e. stitched), using conventional algorithms such as Delaunay's algorithm.

In block 79, generating a new texture for the stitched area is performed. To cover the new stitched area it is necessary to find the projection of the new hull vertices of second fragment in the texture of first fragment. These new vertices are added to the texture vertex pool, and the faces in the stitched area are modified to reflect the new vertex indices for appropriate texturing. Note that various conventional methods of generating new texture may be used by one skilled in the art. For example, various conventional filter algorithms (gaussian, bilinear interpolation, etc.) known in image processing may be used to accomplish this. Merging the data base for the two fragments is performed. The merging of the two data bases are known by one skilled in the art. In one example, the data base of the second fragment is appended to the data base of the first fragment. All vertices which are still used in the second fragment are appended to the vertex pool of the first fragment. A correspondence table may be created which specifies the old vs. new vertex index for these vertices. The faces of second fragment are then appended onto the faces list of first fragment, changing the indices into the 3-D and texture vertex pool according to the correspondence table.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. An apparatus comprising a machine readable medium containing instructions which, when executed by the machine, cause the machine to perform operations comprising:

determining a plurality of first hull edges of a first fragment that enters into a second fragment, wherein determining the plurality of first hull edges of the first fragment that enters into the second fragment further comprises determining an entry and an exit of first hull edges by determining a rotational position of a first hull edge of said first fragment with respect to a crossed second hull edge of said second fragment;

forming a plurality of faces corresponding to said plurality of first hull edges on said second fragment;

propagating said plurality of faces in said second fragment overlapping said first fragment;

eliminating a portion of said second fragment having said plurality of faces; and stitching a first fragment and a remaining second fragment to form an integrated fragment.

2. The apparatus of claim 1, wherein determining the plurality of first hull edges of the first fragment that enters into the second fragment further comprises:

forming a patch with respect to a first hull edge;

projecting said first hull edge on to a plane normal to said patch;

projecting a plurality of second hull edges to said plane;

if said first hull edge crosses one of said plurality of second hull edges then designating said first hull edge and said crossed second hull edge;

if said first hull edge does not cross one of said plurality of second hull edges then moving to a next first hull edge.

3. The apparatus of claim 1, wherein forming further comprises:

determining a crossing between a first hull edge and a second hull edge;

forming a face using said crossed second hull edge and a plurality of edges corresponding to vertices in said second fragment.

4. The apparatus of claim 3, wherein forming further comprises:

determining an edge in said plurality of edges in which a first hull edge exits;

forming another face using said edge and another plurality of edges corresponding to vertices in said second fragment.

5. The apparatus of claim 1 wherein propagating further comprises marking said faces.

6. The apparatus of claim 5 further containing instructions which, when executed by a machine, cause the machine to perform operations including:

coloring said edges of said marked faces;

determining reverse edges in said marked faces in an overlapped region between said first fragment and said second fragment;

forming faces using said reverse edges and a plurality of edges corresponding to vertices in said second fragment.

7. The apparatus of claim 5, wherein eliminating comprises eliminating said plurality of marked faces.

8. The apparatus of claim 1, further containing instructions which, when executed by a machine, cause the machine to perform operations including generating a texture for the integrated fragment.

* * * * *